(12) United States Patent
Herren

(10) Patent No.: US 7,325,329 B2
(45) Date of Patent: Feb. 5, 2008

(54) SALAD SPIN-DRIER

(75) Inventor: Bruno Herren, Hergiswil (CH)

(73) Assignee: MOHA Moderne Haushaltwaren AG, Zollikofen (CH)

( * ) Notice: Subject to any disclaimer, the term of this patent is extended or adjusted under 35 U.S.C. 154(b) by 177 days.

(21) Appl. No.: 11/186,626

(22) Filed: Jul. 21, 2005

(65) Prior Publication Data

US 2006/0037211 A1 Feb. 23, 2006

(30) Foreign Application Priority Data

Jul. 21, 2004 (CH) .................................. 01230/04
Oct. 10, 2004 (CH) .................................. 01672/04

(51) Int. Cl.
*F26B 11/02* (2006.01)
*F26B 5/08* (2006.01)

(52) U.S. Cl. ............................. 34/58; 34/184; 99/495; 99/511; 99/513

(58) Field of Classification Search .................... 34/58, 34/184, 127, 128, 312, 317, 318, 322; 99/495, 99/511, 512, 513, 516, 536
See application file for complete search history.

(56) References Cited

U.S. PATENT DOCUMENTS 2,913,121 A * 11/1959 Randolph-Randolph .... 210/470
5,054,209 A * 10/1991 Koff .............................. 34/58

FOREIGN PATENT DOCUMENTS

| CH | 353509 | 5/1961 |
|---|---|---|
| EP | 0 439 413 A1 | 7/1991 |
| EP | 0 919 177 A1 | 6/1999 |
| FR | 1 012 262 | 7/1952 |
| FR | 2 688 131 | 9/1993 |
| WO | 03/043477 A1 | 5/2003 |

* cited by examiner

*Primary Examiner*—Jiping Lu
(74) *Attorney, Agent, or Firm*—Pauly Petersen & Erickson

(57) ABSTRACT

A salad spin-drier with a bowl of glass or ceramic so that part of the water collection bowl, which until now has been purely functional, may be simultaneously used as a serving bowl for the salad. The salad bowl as is standard apart from the bowl has a lid in which a drive mechanism having a rotary drive plate with a cord drum and a pull cord may be set into rotational movement by a pull grip. The rotary drive plate with tabs engages into suitable ribs on the spin-drier basket. The spin-drier basket has a bearing recess which rests on a bearing cam. The bearing cam is separated from the bowl centrally on a plate. The bowl has a planar inner base on which the plate rests, and by way of an abutment edge limiting the plane base one achieves a central mounting of the plate. For the simplified removal of the plate these may have suitable openings easier gripping. A rubber-elastic rest is on the underside of the plate and serves as scratch-protection and slip-protection.

18 Claims, 1 Drawing Sheet

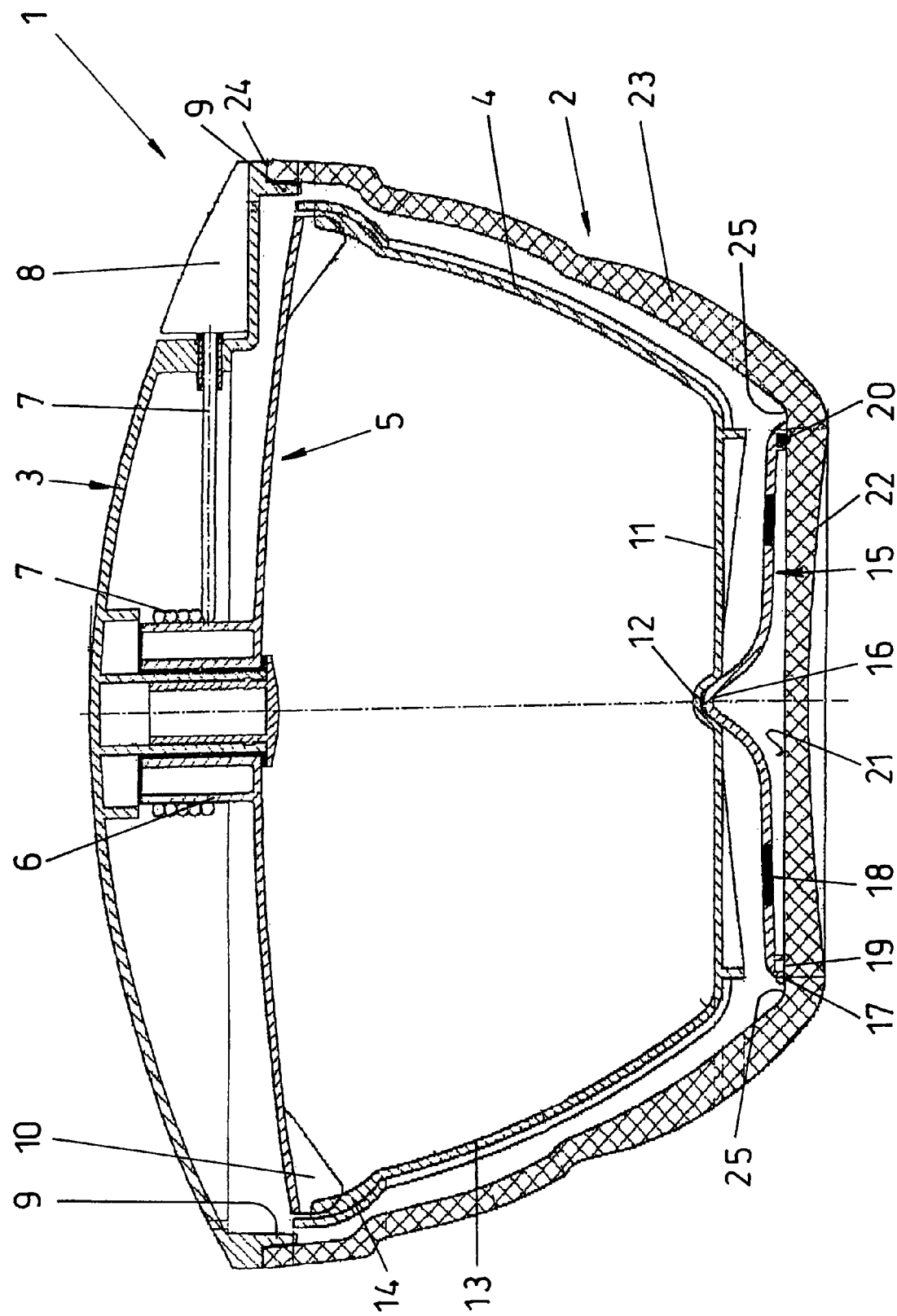

SALAD SPIN-DRIER

BACKGROUND OF THE INVENTION

1. Field of the Invention

This invention relates to a salad spin-drier including a bowl and a sieve-like spin-drier basket mounted therein, which rests with a bearing recess on a bearing cam, a lid on whose lower side a rotary drive plate is rotatably arranged about a vertical axis and which via tabs is engaged with the spin-drier basket, and a drive with which the rotary drive plate may be set into rotation, wherein the lid has an engagement edge which engages into the bowl.

2. Discussion of Related Art

Salad spin-driers are for example known from European Patent Reference EP-0 919 177, and older models with a different type of mounting of the spin-drier basket are for example known from French Patent Reference FR-A-1 012 262 or from Swiss Patent Reference CH-A-353 509.

Salad spin-driers available in the market are known, for example as taught by PCT International Publication WO-03/043477.

Salad spin-driers of the known constructional type have a relatively large volume and accordingly take up a lot of space in the refrigerator. After the salad is relatively freed of clinging water from the previous rinsing procedure in the salad spin-drier, the salad is removed from the spin-drier basket and put into a salad bowl for further preparation. The corresponding salad bowl is relatively large and takes up further space in the kitchen.

It would be apparent to also use the bowl of the salad spin-drier for preparing and serving the salad. With the salad spin-driers which are common on the market this is not realized in a meaningful manner. The bowls are manufactured of transparent plastic so that one may recognize when the shaking procedure may be completed. These transparent plastic bowls however fall far short of aesthetic aspects which one usually places on a salad bowl. Also, these bowls have designs which are widespread and are commonplace today have a central raised bearing cam which is manufactured as one piece with the base of the bowl. This cam is not only aesthetically displeasing, but it really interferes when the salad in the bowl is mixed with the dressing. In particular, the prongs of the salad cutlery may also snag with the bearing cam, wherein in the worst case the bearing cam may be destroyed.

The latter problem is not present if one manufactures a bowl for an apparatus for mixing salads, such as taught by European Patent Reference EP-A-0 439 413 which generally mentions that the bowl may be manufactured on any material, thus of glass and ceramic. In this case, which is of a significantly lesser problem than a quickly rotating salad spin-drier, adaptations to dimensional inaccuracies are required as taught by French Patent Reference FR-A-2 688 131, wherein a solution is shown with which the dimensional inaccuracies are compensated by a bearing shaft which is adjustable in the longitudinal direction.

SUMMARY OF THE INVENTION

It is one object of this invention to provide a salad spin-drier which has a bowl that may simultaneously be used as a serving bowl for the salad without the previously mentioned disadvantages.

This object is achieved with a salad spin-drier having features taught in this specification and in the claims.

For its solution, there are two steps which are realized, specifically changing the material selection, and also designing the bowl such that it is functional for both tasks, such as serving as a receiving basket during the shaking procedure with a corresponding mounting (bearing) function, and also having the function of a salad bowl, wherein the obstructing bearing cam which at the same time can be easily destroyed is designed as a separate part. Thus, manufacturing the bowl of the salad spin-drier of glass is particularly relevant. This solution which may be known to the novice is not necessarily a route taken by a person skilled in the art. For this, one must know that the dimensional accuracy of glass bowls and also bowls of used ceramics are subjected to high tolerances in manufacture. In particular, relatively large glass bowls with diameters of 20 to 30 cm may be so unround that the diameter of the bowl may deviate by up to 5% from the ideal standard diameter. Such an inaccuracy however leads to problems with the functional ability of the salad spin-drier which may permit such dimensional inaccuracies only within a very tight tolerance range at all. Contrary to manufacturing methods which are common today, the glass bowls used here are measured with regard to their dimensional accuracy and accordingly those bowls which lie outside the allowable tolerance are led back to the glass smelt. According to experience, the rejection rate lies far above 10% of the total production. Such a value is however not at all a problem in the glass industry because a leading back of the glass to the molten mass is desirable.

Also the attachment of the bearing journal in the glass base of the bowl would also be problematic. The large differences in the wall thickness which would thus arise lead to corresponding stresses which greatly influence the quality of the bowls.

Accordingly, this invention includes a bearing cam which is applied into the bowl as an insertable plate. This plate and the inner base of the bowl are adapted to one another with regard to size and shape.

BRIEF DESCRIPTION OF THE DRAWING

One embodiment of the subject matter of this invention is described in view of a sectional drawing and in the subsequent description.

DESCRIPTION OF PREFERRED EMBODIMENTS

One embodiment of the subject matter of this invention is shown in the drawing. The salad spin-drier is indicated in its entirety by element reference numeral 1 which comprises a bowl 2 that according to this invention is manufactured of glass or ceramic and of a lid 3 which fits thereon. When referring to glass bowls, the solution of ceramic is also understood in as much as the context is retained. A removable spin-drier basket 4 may be inserted into the bowl 2. This spin-drier basket 4 is usually manufactured of plastic, just the same as the lid 3. The lid 3 may however also be manufactured of metal, in particular stainless steel or a chromium-plated steel. In one embodiment, a lid with an automatic cord return and double acting free-run is used, as is known from PCT International Publication WO 03/043477. A rotary drive plate 5 is integrated in the lid 3 and is rotatably mounted on a bearing journal on the inner side of the lid 3. The rotary drive plate 5 is rigidly connected to a cord drum 6 on which a pull cord 7 is wound, or may be withdrawn by way of a suitable pulling which the user applies to the pull grip 8. The further design of the drive mechanism is omitted and by way of example, such as taught by PCT International Publication WO-03/043477. However, the design of the drive mechanism is not significant with respect to this invention. Thus, the drive can be operated by a pull cord or a crank, as known with older salad spin-driers.

On the lower side, the rotary drive plate 5 is provided with tabs 10 directed towards the spin-drier basket 4, which may be brought into a meshing engagement with the spin-drier basket 4.

The spin-drier basket 4 can be of plastic and designed according to a sieve 11, and have a spin-drier basket base 11 in which a bearing recess 12 is integrally formed, which projectingly extends into the inside of the spin-drier basket 4. The spin-drier basket wall 13 extends upwards connecting to the spin-drier basket base 11 and ends in a thickened edge 14 in which on an inner side are formed a multitude of locking grooves lying tightly on one another, between and into which the tabs 10 on the rotary drive plate 5 may engage.

The spin-drier basket 4 is mounted on the bearing cam 16 which is integrally formed in a plate 15, as point-like as possible. This plate 15 which may be manufactured from any material is preferably manufactured of plastic or metal. For minimizing the friction, the mounting of the spin-drier basket 4 manufactured of plastic on a metal bearing cam is particularly advantageous. Accordingly, the plate 15 is preferably manufactured of stainless steel or of a chromium-plated steel. The plate 15 preferably has a peripheral edge 17 which in its position of use is shaped downwards towards the base of the bowl. The plate 15 can have at least two openings 18 which permits a simplified gripping of the plate 15.

With this plate 15, the glass bowl 2 no longer needs to have a bearing cam. However, so that the plate 15 does not scratch the glass bowl 2, the plate 15 can have a peripheral channel 19 in which a rubber-elastic rest 20 may be held in a secured manner. This rubber-elastic rest 20 not only forms a scratch protection, but likewise an anti-slip, and thus ensures that the plate 15 may not slip during the shaking procedure. In order to prevent this, the glass bowl 2 can be designed accordingly. The glass bowl 2 may comprise a planar inner base 21 and its diameter can correspond at least approximately exactly to the diameter of the plate 15 to be inserted. Also, the transition of the planar inner base 21 to the inner wall 23 can be designed with an as small as possible radius so that in this region there is a peripheral abutment edge 25 that arises. In the example represented here, the inner base 21 of the bowl 2 is designed planar over the whole surface while the outer surface of the base is shaped as a concave outer base 22.

It is also possible to shape the inner base convexly in the middle, wherein at least one planar annular surface can remain peripherally about this raised part, which ensures a suitable plane rest of the plate 15. In principle an at least approximate positive-fit design of the plate 15 and of the inner base is possible. This however is not practical in reality. For this, the dimensional inaccuracy of glass bowls and bowls of common ceramics would be too large. It is these problems which must be considered when manufacturing the glass bowls. Thus the glass or ceramic bowls must be exactly controlled, wherein a roundness of the bowl which is as exact as possible, which is important. Thus the diameter of the bowl in the upper edge region should not deviate from a standard diameter which is set by the lid by more than maximal 2%, and preferably only about 1%. If however the deviations are too large, then it is no longer ensured that the rest edge of the lid 3 lies on the bowl edge 24 is a sufficient manner. If the rest is insufficient then the lid may tip into the bowl, wherein the various elements may jam. The deviations of the dimensional accuracy at the inner base of the bowl are usually considerably smaller. The diameter of the planar surface 21 and the diameter of the plate 15 should be matched to one another so that these two diameters differ from one another by less than half the diameter of the bearing cam 16. If these differences are too large, then with a non-uniform distribution of weight of the spin-drier basket 4, the spin-drier basket 4 may deform during the shaking procedure, and then lie in an oblique manner and accordingly snag.

Swiss Patent References CH-01230/04 and CH-01672/04, the priority documents corresponding to this invention, and their teachings are incorporated, by reference, into this specification.

We claim:

1. In a salad spin-drier having a bowl (2) and a spin-drier basket (4) with a bearing recess (12) mounted therein and resting with a bearing cam (16) in the bearing recess (12), a lid (3) having a lower side on which a rotary drive plate (5) is rotatably arranged about a vertical axis, tabs (10) engaged with the spin-drier basket (4), a drive with which the rotary drive plate (5) is rotatable, the lid (3) having an engagement edge (9) which engages into the bowl (2), the salad spin-drier comprising: the bowl (2) of one of a glass and a ceramic having an inner base (21) with a planar rest, the bearing cam (16) integrally formed in a plate (15), the plate (15) having at least one peripheral downwardly shaped edge loosely mounted on the inner base (21), the plate (15) manufactured of one of a plastic and a metal and the bearing cam (16) manufactured as one piece therefrom projecting upwardly, and a diameter of the inner base (21) and a second diameter of the plate (15) mounted therein are at least approximately equal.

2. In the salad spin-drier according to claim 1, wherein an outer diameter of the glass bowl (2) deviates from a standard diameter set by the lid (3) by not more than 2%.

3. In the salad spin-drier according to claim 1, wherein the inner base (21) is planar and a transition to a wall of the bowl (2) forms an abutment edge (25) for the inserted plate (15).

4. In the salad spin-drier according to claim 3, wherein a third diameter of the planar surface is larger by at least one-half than a fourth diameter of the bearing cam (16).

5. In the salad spin-drier according to claim 1, wherein the inner base (21) of the bowl (2) is curved and has a planar annular surface with a transition to the wall of the bowl that forms an abutment for the inserted plate (15).

6. In the salad spin-drier according to claim 5, wherein a third diameter of the planar surface is larger by at least one-half than a fourth diameter of the bearing cam (16).

7. In the salad spin-drier according to claim 1, wherein the plate (15) has at least two punched openings (18) for gripping the plate (15).

8. In a salad spin-drier having a bowl (2) and a spin-drier basket (4) with a bearing recess (12) mounted therein and resting with a bearing cam (16) in the bearing recess (12), a lid (3) having a lower side on which a rotary drive plate (5) is rotatably arranged about a vertical axis, tabs (10) engaged with the spin-drier basket (4), a drive with which the rotary drive plate (5) is rotatable, the lid (3) having an engagement edge (9) which engages into the bowl (2), the salad spin-drier comprising: the bowl (2) of one of a glass and a ceramic having an inner base (21) with a planar rest, the bearing cam (16) integrally formed in a plate (15), the plate (15) on a surface that lies on the inner base (21) in a position of use has one of a peripheral channel and a groove (19) with a rubber-elastic rest (20) loosely mounted on the inner base (21) as a scratch-protection and slip-protection, the plate (15) manufactured of one of a plastic and a metal and the bearing cam (16) manufactured as one piece therefrom projecting upwardly, and a diameter of the inner base (21) and a second diameter of the plate (15) mounted therein are at least approximately equal.

9. In the salad spin-drier according to claim 8, wherein the inner base (21) is planar and a transition to a wall of the bowl (2) forms an abutment edge (25) for the inserted plate (15).

10. In the salad spin-drier according to claim 8, wherein the inner base (21) of the bowl (2) is curved and has a planar annular surface with a transition to the wall of the bowl that forms an abutment for the inserted plate (15).

11. In the salad spin-drier according to claim 10, wherein a third diameter of the planar surface is larger by at least one-half than a fourth diameter of the bearing cam (16).

12. In the salad spin-drier according to claim 8, wherein the plate (15) has at least two punched openings (18) for gripping the plate (15).

13. A salad spin-drier, comprising:
- a bowl (2) of one of a glass and a ceramic and having an inner base (21) with a planar rest,
- a spin-drier basket (4) with a bearing recess (12) mounted within the bowl and resting with a bearing cam (16) in the bearing recess (12);
- a lid (3) having a lower side on which a rotary drive plate (5) is rotatably arranged about a vertical axis, tabs (10) engaged with the spin-drier basket (4), a drive with which the rotary drive plate (5) is rotatable, and an engagement edge (9) which engages into the bowl (2);
- a plate (15) having at least one peripheral downwardly shaped edge loosely mounted on the inner base (21), the plate (15) manufactured of one of a plastic and a metal, the bearing cam (16) integrally formed as one piece with the plate (15) and therefrom projecting upwardly, and a diameter of the plate (15) is at least approximately equal to a second diameter of the inner base (21).

14. The salad spin-drier of claim 13, wherein the downwardly shaped edge comprises one of a peripheral channel and a groove (19) containing a rubber-elastic rest (20) as a scratch-protection and slip-protection.

15. In the salad spin-drier according to claim 13, wherein the inner base (21) is planar and a transition to a wall of the bowl (2) forms an abutment edge (25) for the inserted plate (15).

16. In the salad spin-drier according to claim 13, wherein the inner base (21) of the bowl (2) is curved and has a planar annular surface with a transition to the wall of the bowl that forms an abutment for the inserted plate (15).

17. In the salad spin-drier according to claim 16, wherein a third diameter of the planar surface is larger by at least one-half than a fourth diameter of the bearing cam (16).

18. In the salad spin-drier according to claim 13, wherein the plate (15) has at least two punched openings (18) for gripping the plate (15).

* * * * *